United States Patent
Hwang et al.

(10) Patent No.: US 11,655,995 B2
(45) Date of Patent: May 23, 2023

(54) METHOD OF CONTROLLING OPERATION OF AIR CONDITIONER BY ANALYZING USER'S BEHAVIOR PATTERN AND AIR CONDITIONER

(71) Applicant: LG ELECTRONICS INC., Seoul (KR)

(72) Inventors: Sung Mok Hwang, Seoul (KR); Sang Yun Kim, Seoul (KR); Jin Ok Kim, Seoul (KR); Yun Sik Park, Seoul (KR); Dayun Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 510 days.

(21) Appl. No.: 16/490,016

(22) PCT Filed: May 2, 2019

(86) PCT No.: PCT/KR2019/005286
§ 371 (c)(1),
(2) Date: Aug. 29, 2019

(87) PCT Pub. No.: WO2020/222341
PCT Pub. Date: Nov. 5, 2020

(65) Prior Publication Data
US 2021/0381717 A1    Dec. 9, 2021

(51) Int. Cl.
*F24F 11/77* (2018.01)
*F24F 11/63* (2018.01)
(Continued)

(52) U.S. Cl.
CPC .............. *F24F 11/77* (2018.01); *F24F 11/63* (2018.01); *F24F 11/74* (2018.01); *G06V 20/20* (2022.01);
(Continued)

(58) Field of Classification Search
CPC ........ F24F 11/77; F24F 11/63; F24F 2120/12; F24F 2120/14; G06K 9/00335; G06K 9/00671
See application file for complete search history.

(56) References Cited

U.S. PATENT DOCUMENTS

2003/0096572 A1* 5/2003 Gutta ..................... F24F 11/30
454/229
2011/0205371 A1* 8/2011 Nagata ................... G06T 7/246
348/207.1
(Continued)

FOREIGN PATENT DOCUMENTS

JP          6-58593 A       3/1994
JP       2008-51463 A       3/2008
(Continued)

*Primary Examiner* — Kidest Bahta
(74) *Attorney, Agent, or Firm* — Birch, Stewart, Kolasch & Birch, LLP

(57) ABSTRACT

Disclosed herein are a method of controlling operations of an air conditioner by analyzing a user's behavior pattern, and an air conditioner, the present disclosure according to an embodiment includes an air blower configured to discharge air, a camera configured to acquire images of a space in which an indoor unit of the air conditioner is disposed, and a control unit configured to extract features from the image acquired by the camera, to generate image descriptions, and to control the air conditioner using parameters generated in response to the image descriptions.

14 Claims, 10 Drawing Sheets

(51) Int. Cl.
*F24F 11/74* (2018.01)
*G06V 20/20* (2022.01)
*G06V 40/20* (2022.01)
*F24F 120/12* (2018.01)
*F24F 120/14* (2018.01)

(52) U.S. Cl.
CPC ......... *G06V 40/20* (2022.01); *F24F 2120/12* (2018.01); *F24F 2120/14* (2018.01)

(56) References Cited

U.S. PATENT DOCUMENTS

| | | | | |
|---|---|---|---|---|
| 2014/0114643 | A1* | 4/2014 | Baker | G06T 11/60 704/9 |
| 2014/0217185 | A1* | 8/2014 | Bicknell | F24F 11/30 236/1 C |
| 2015/0330646 | A1 | 11/2015 | Matsumoto | |
| 2017/0159957 | A1* | 6/2017 | Park | F24F 1/0014 |
| 2018/0209681 | A1* | 7/2018 | Song | F24F 11/77 |
| 2019/0120517 | A1* | 4/2019 | Gyota | F24F 11/64 |

FOREIGN PATENT DOCUMENTS

| | | | |
|---|---|---|---|
| JP | 2010-25359 A | | 2/2010 |
| JP | 2012-42074 A | | 3/2012 |
| JP | 2013-253717 A | | 12/2013 |
| JP | 2015-181425 A | | 9/2015 |
| JP | 2016-169942 A | | 9/2016 |
| JP | WO2017/179116 | * | 10/2017 |
| JP | 2018-59672 A | | 4/2018 |
| KR | 10-2007-0121961 A | | 12/2007 |
| KR | 10/1558504 B1 | * | 10/2015 |
| KR | 10-2019-0026384 A | | 3/2019 |
| KR | 2019/0035007 A | * | 3/2019 |
| KR | 10-2019-0035007 A | | 4/2019 |

* cited by examiner

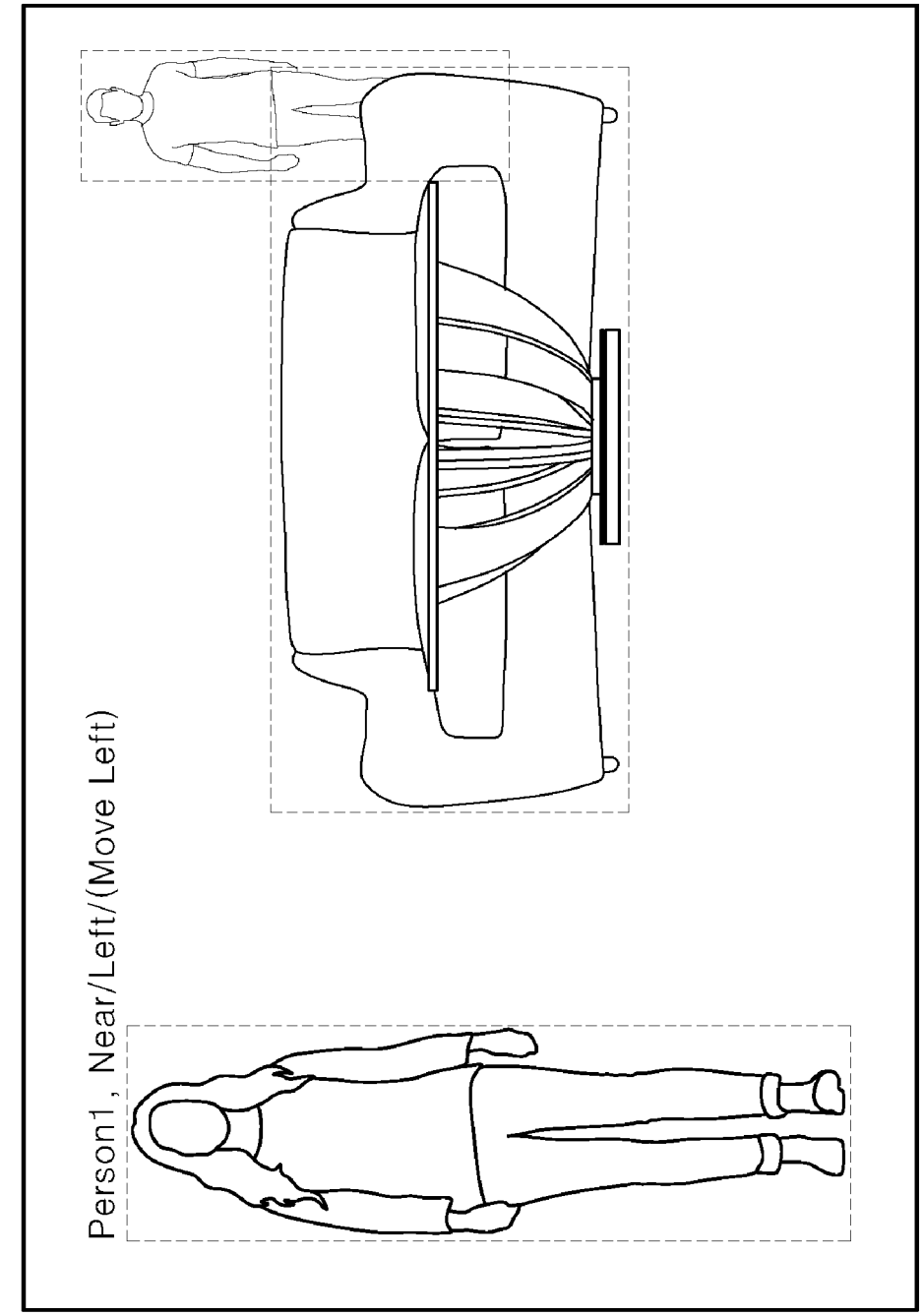

METHOD OF CONTROLLING OPERATION OF AIR CONDITIONER BY ANALYZING USER'S BEHAVIOR PATTERN AND AIR CONDITIONER

CROSS REFERENCE TO RELATED APPLICATIONS

This application is the National Phase of PCT International Application No. PCT/KR2019/005286, filed on May 2, 2019, which is hereby expressly incorporated by reference into the present application.

TECHNICAL FIELD

The present disclosure relates to a method of controlling operations of an air conditioner by analyzing a user's behavior patterns and an air conditioner.

BACKGROUND

An air conditioner (or an aircon as a short form) is a device that may discharge cool-temperature air to an indoor space, adjust indoor temperatures, and clean indoor air to provide a pleasant indoor environment for people.

In general, the air conditioner includes an indoor unit that is placed indoors, and an outdoor unit that is comprised of a compressor, a heat exchanger, and the like and that supplies refrigerants to the indoor unit.

The indoor unit and outdoor unit may be separately controlled. In the air conditioner, one or more indoor units may connect to the outdoor unit. The outdoor unit supplies refrigerants to the indoor unit based on a requested operation state. Accordingly, the air conditioner operates in a heating mode or a cooling mode.

Air conditioners control air currents and temperatures on the basis of features of users and spaces. Conventionally, users are required to control air conditioners when necessary. This causes inconvenience to the users. Accordingly, there is a need for technologies to enable air conditioners to automatically operate on the basis of various methods.

A technology for allowing an air conditioner to supply air having temperatures, speeds and directions appropriate for a user even when the user does not control the air conditioner are described.

DISCLOSURE

Technical Problems

As a means to solve the above-described problems, the present disclosure is to enable an air conditioner to identify a user using an image.

The present disclosure is to control an air conditioner such that the air conditioner operates in response to a user's behavior patterns.

The present disclosure is to control an air conditioner such that the air conditioner confirms actions of people around the air conditioner and operates in accordance with the actions of the people.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

An air conditioner which analyzes a user's behavior patterns and controls operations, according to an embodiment, includes an air blower discharging air, a camera acquiring images of a space in which an indoor unit of the air conditioner is disposed, and a control unit extracting features from the image acquired by the camera to generate image descriptions and controlling the air conditioner using parameters generated in response to the image descriptions.

An air conditioner which analyzes a user's behavior patterns and controls operations, according to an embodiment, includes an encoder receiving images, extracting features and generating feature vectors, and a decoder receiving the feature vectors and generating image descriptions including words.

An air conditioner which analyzes a user's behavior patterns and controls operations, according to an embodiment, controls any one or more of speeds, amounts, directions, or temperatures of air discharged by the air conditioner, or operation modes of the air conditioner, using image descriptions.

An air conditioner which analyzes a user's behavior patterns and controls operations, according to an embodiment, places higher priority on an image description of a person at the center of an image or a person near the air conditioner in an image.

A method of analyzing a user's behavior patterns and controlling operations of an air conditioner, according to an embodiment, includes acquiring images of a space, in which an indoor unit of the air conditioner is disposed, by a camera of the air conditioner, extracting features from the images, acquired by the camera, by a control unit of the air conditioner, generating image descriptions describing images on the basis of the extracted features by the control unit, and controlling the air conditioner using parameters generated in response to the image descriptions by the control unit.

Advantageous Effects

The present disclosure according to embodiments may analyze a user's behavior patterns and may control operations of an air conditioner.

The present disclosure according to embodiments, an air conditioner may acquire and extract image and generate information describing people's behavior on the basis of the image.

The present disclosure according to embodiments may blow wind at temperatures and in modes appropriate for people in images on the basis of the attributes, states, clothes, or locations of the people.

Effects of the present disclosure are not limited to the above-described ones, and one having ordinary skill in the art to which the disclosure pertains may easily draw various effects from the configuration of the disclosure.

DESCRIPTION OF THE DRAWINGS

FIG. 10 shows a process of an image description with a focus on a change of image according to an embodiment.

DETAILED DESCRIPTION

Figure 1:
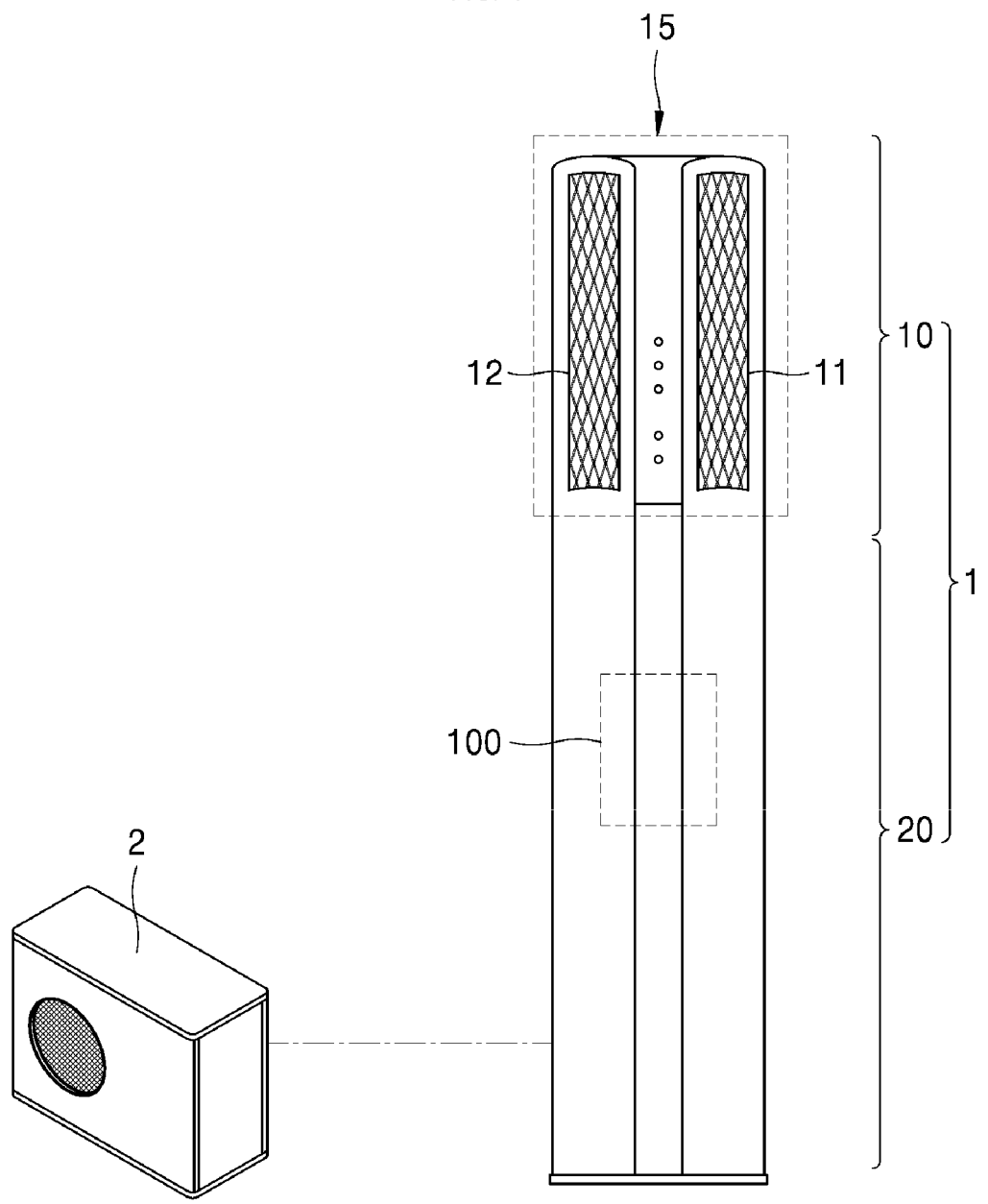
FIG. 1 shows the front of a configuration of an indoor unit of an air conditioner according to an embodiment.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and identical or similar components are denoted by an identical reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

In this specification, components constituting an air conditioner are classified as an outdoor unit and an indoor unit. A single air conditioning system is comprised of one or more outdoor units and one or more indoor units. A relationship between an outdoor unit and an indoor unit may be expressed as 1:1, 1:N, or M:1.

The present disclosure may be applied to all apparatuses that control cooling or heating. However, in the present disclosure, the focus is placed on cooling for convenience of description. When the present disclosure is applied to heating, embodiments of the present disclosure may be applied to a process of raising temperatures and to a mechanism for maintaining the raised temperatures.

FIG. 1 shows the front of a configuration of an indoor unit of an air conditioner according to an embodiment.

An indoor unit of an air conditioner may be classified as a built-in indoor unit that is installed on the ceiling, a standing indoor unit, a wall mounted indoor unit, or a movable indoor unit. FIG. 1 shows a standing indoor unit 1 among other indoor units. However, the present disclosure is not limited. An indoor unit 1 may be connected with an outdoor unit 2 that is disposed in an additional space.

An air conditioner may be a standing air conditioner that stands on the floor in a space subject to air conditioning. In this case, the air conditioner may further include a base 20 that is placed on the floor in the space and that supports an air conditioning module 10.

The air conditioning module 10 may be installed on the base 20, and in this case, may suction air at a certain height in the space and may perform air conditioning.

The air conditioning module 10 may be detachably connected with the base 20 or may be integrally connected with the base 20.

The air conditioning module 10 may discharge air from an air blower 15. The air conditioning module 10 may concentratedly discharge air from the entire front surface thereof, or may discharge air from air blowing openings disposed in various directions on the lateral surfaces, the upper surface and the like thereof according to embodiments. The air blower 15 may control speeds of air on the basis of control by a control module 100. As an exemplary embodiment, the air blower 15 may discharge air at multi-stage speeds, and to this end, may control one or more individual air blowing fans.

Specifically, the air blower 15 includes components (11, 12) that discharge air supplied by an outdoor unit as wind and that suction indoor air, and the components may be disposed in the air conditioning module 10. Though not identified from the outside, the control module 100 that controls the indoor unit 1 may be disposed in the indoor unit 1. In FIG. 1, the control module 100 displayed as a dotted line is disposed in the indoor unit 1 for convenience of description.

The outdoor unit 2 controls temperatures of air (wind) discharged from the air blower 15. As an exemplary embodiment, a compressor of the outdoor unit 2 may discharge vapor-phase refrigerants by compressing the vapor-phase refrigerants at high temperatures and high pressures, and may provide cooling air to the indoor unit 1. Additionally, the outdoor unit 2 may provide heating air to the indoor unit 1 using a predetermined heat pump. Various methods for providing cooling or heating air to the indoor unit 1 by the outdoor unit 2 may be presented, and the present disclosure is not limited to the methods.

As an exemplary embodiment, the indoor unit 1 in FIG. 1 measures the state of indoor air and operates so that the indoor air may reach a set state. An air conditioner is required to confirm behavior patterns of a user in a space with an indoor unit such that the indoor unit may efficiently operate in the process in which indoor air reaches a specific state.

Accordingly, an embodiment of the present invention presents technologies in which the control module 100 acquires images of a space using a camera, analyzes behavior patterns of a user in the space, and controls air currents such that the air currents have speeds/directions/temperatures fit for the user, thereby controlling the indoor unit and the outdoor unit.

Figure 2:
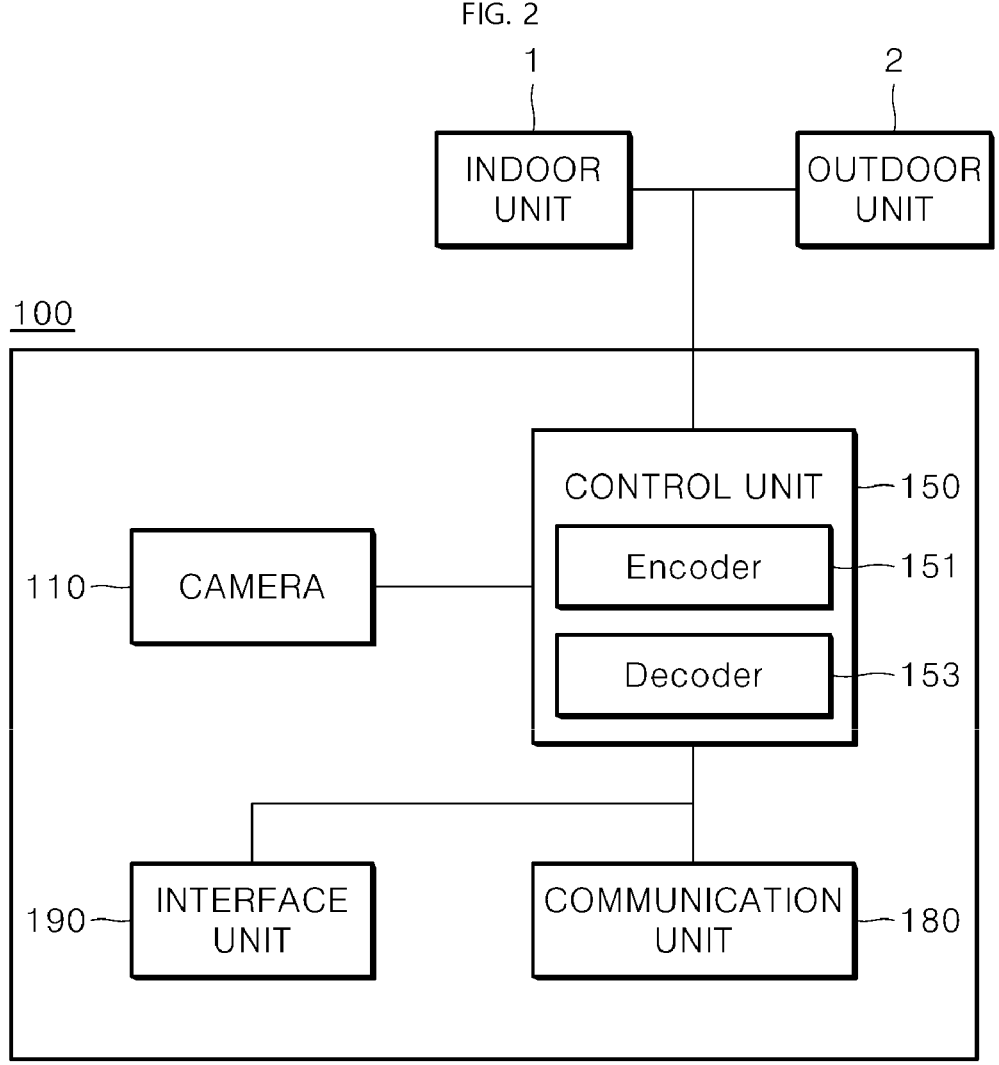
FIG. 2 shows a configuration of a control module according to an embodiment.

FIG. 2 shows a configuration of a control module according to an embodiment. The control module 100 may be disposed in an indoor unit 1, and may control the indoor unit 1 and an outdoor unit 2.

Specifically, the control module 100 includes a camera 110, a control unit 150, a communication unit 180, and an interface unit 190 as components.

The camera 110 acquires images of a space in which the indoor unit 1 of the air conditioner is placed.

The control unit 150 extracts features from images acquired by the camera 110, generates image descriptions, and controls the air conditioner using parameters generated in response to the image descriptions.

Controlling an air conditioner denotes the control unit 150 controlling any one or more of speeds, amounts, directions, or temperatures of air discharged by the air conditioner, or operation modes of the air conditioner by using the image descriptions. Thus, the air conditioner may control operations by analyzing behavior patterns of the user.

Image sensors are referred to as a camera 110. The camera 110 may be disposed in the indoor unit 1 of the air conditioner or may be additionally disposed in a space in which the indoor unit 1 is installed. The camera 110 acquires images of the space in which the indoor unit 1 is placed. The control unit 150 extracts features from the images, analyzes the current state of a user, clothes worn by the user, behaviors of the user and the like, and controls amounts, speeds, temperatures, currents and the like of air of the air conditioner on the basis of results of the analysis.

The control unit 150 includes an encoder 151 that generates feature vectors by receiving images and extracting features, and a decoder 153 that generates image descriptions including words by receiving the feature vectors.

That is, the control unit 150 includes an encoder 151 that extracts features from image information to analyze the behaviors, the features, the location and the like of a user, and a decoder 153 that describes images using feature vectors extracted through the encoder. The encoder 151 and the decoder 153 in the control unit 150 may be integrally formed as a software module or a hardware module.

An air blower 15 may control directions of wind. For exemplary embodiment, the air blower 15 may be comprised of a left vane and a right vane, or an upper vane and a lower vane. The left and right vanes may determine left and right directions of wind, and the upper and lower vanes may determine distances of wind.

The interface unit 190 allows the user to control temperatures, humidity, amounts, directions and the like of winds of the air conditioner, and provides a button type, a remote controller type and the like of interface. Additionally, the interface unit 190 may receive interrupt inputs that change speeds, amounts or temperatures of air discharged from the air blower 15.

Figure 3:
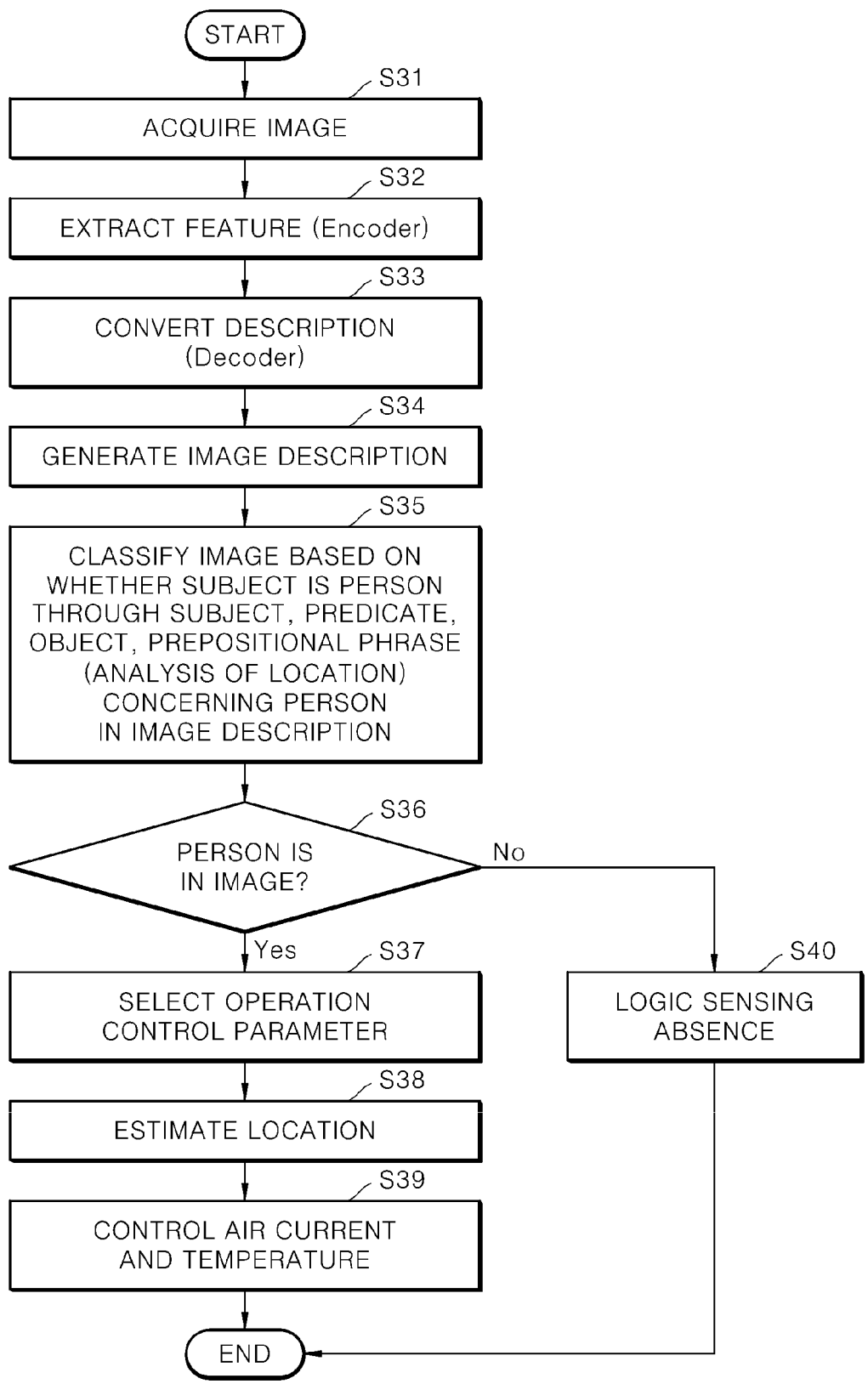
FIG. 3 shows a process in which a control module controls operations of an air conditioner after an image is acquired according to an embodiment.

FIG. 3 shows a process in which a control module controls operations of an air conditioner after an image is acquired according to an embodiment.

A camera 110 on the surface of an indoor unit 1 captures a space and acquires images (S31).

Additionally, a control unit 150 extracts features from the images and generates feature vectors (S32). The control unit 150 may use deep learning that is a type of machine learning, and in this process, may extract features using a learning network that is a deep learning-based artificial neural network.

This denotes deep learning in different stages on the basis of data. Deep learning may represent a collection of machine learning algorithms that extract key data from a plurality of data in higher stages.

The structure of deep learning may include an artificial neural network (ANN), and for example, the structure of deep learning may be comprised of deep neural networks (DNN) such as a convolutional neural network (CNN), a recurrent neural network (RNN), a deep belief network (DBN) and the like.

A learning network to which deep learning is applied may be included in the control unit 150 or an encoder 151, a decoder 153 and the like, or may be disposed in an external server. The learning network extracts features or feature vectors from input images.

An artificial neural network (ANN) may include an input layer, a hidden layer, and an output layer. Each of the layers includes a plurality of nodes and connects to the following layer. Nodes between adjacent layers may have weight and may connect with each other.

The control unit 150 may extract elements as features from images and may form the elements into a vector.

The encoder 151 of the control unit 150 may perform step 32. The decoder 153 receives feature vectors extracted by the encoder 151 and converts the feature vectors into descriptions (S33). The decoder 153 generates image descriptions that describe images acquired in step 31 using the converted descriptions (S34). That is, the decoder 153 receives feature vectors and generates image descriptions required for analyzing behaviors or features of people in the images.

Additionally, the control unit 150 classifies images on the basis of whether a subject indicates a person through a subject, a predicate, an object, and a prepositional phrase (analysis of locations) concerning the person in the image descriptions (S35). That is, the control unit 150 analyzes sentences included in the image descriptions. As a result of analysis, the control unit 150 may acquire information on whether the subject indicates a human, on what the person is doing (predicates), on how far the person is from an object (locations, prepositional phrases) and the like. Certainly, the control unit 150 may confirm whether a person is in an image.

Thus, the control unit 150 confirms whether a person is in an image (S36), and when confirming a person is not in the image, controls the indoor unit 1 or the outdoor unit 2 using absence detection logic (S40).

When confirming a person is in the image, the control unit 150 selects operation control parameters in response to the above-described image descriptions (S37), estimates the location of the person (S38), and controls the indoor unit 1 or the outdoor unit 2 (S39). As an example, the control unit 150 may control air currents (directions and intensity of blown winds) and temperatures of an air blower 15.

A recurrent neural network (RNN) may be used to process natural languages and the like, and as an effective structure for processing time-series data that are changed according to temporal flows, may constitute an artificial neural network by piling layers at every moment.

A deep belief network (DBN) is a deep learning structure in which Restricted Boltzman Machines (RBM) as a type of deep learning are stacked in multiple layers. When the RBM learning is repeated and then a specific number of layers are formed, a DBN having the specific number of layers may be formed.

A convolutional neural network (CNN) is a structure that is often used to recognize an object. The CNN is a model that simulates functions of the brain of a person on the assumption that the brain extracts fundamental features of an object, performs complex calculations, and then recognizes the object on the basis of results of calculation, when the person recognizes the object.

As an exemplary embodiment, the encoder 151 of the control unit 150 may use the CNN among machine learning-based neural networks.

Further, as an exemplary embodiment, the decoder 153 of the control unit 150 may use the RNN or the LSTM among machine learning-based neural networks.

The control unit 150 controls air currents and temperatures according to the context using descriptions of images (image descriptions) generated by the decoder 153

Figure 4:
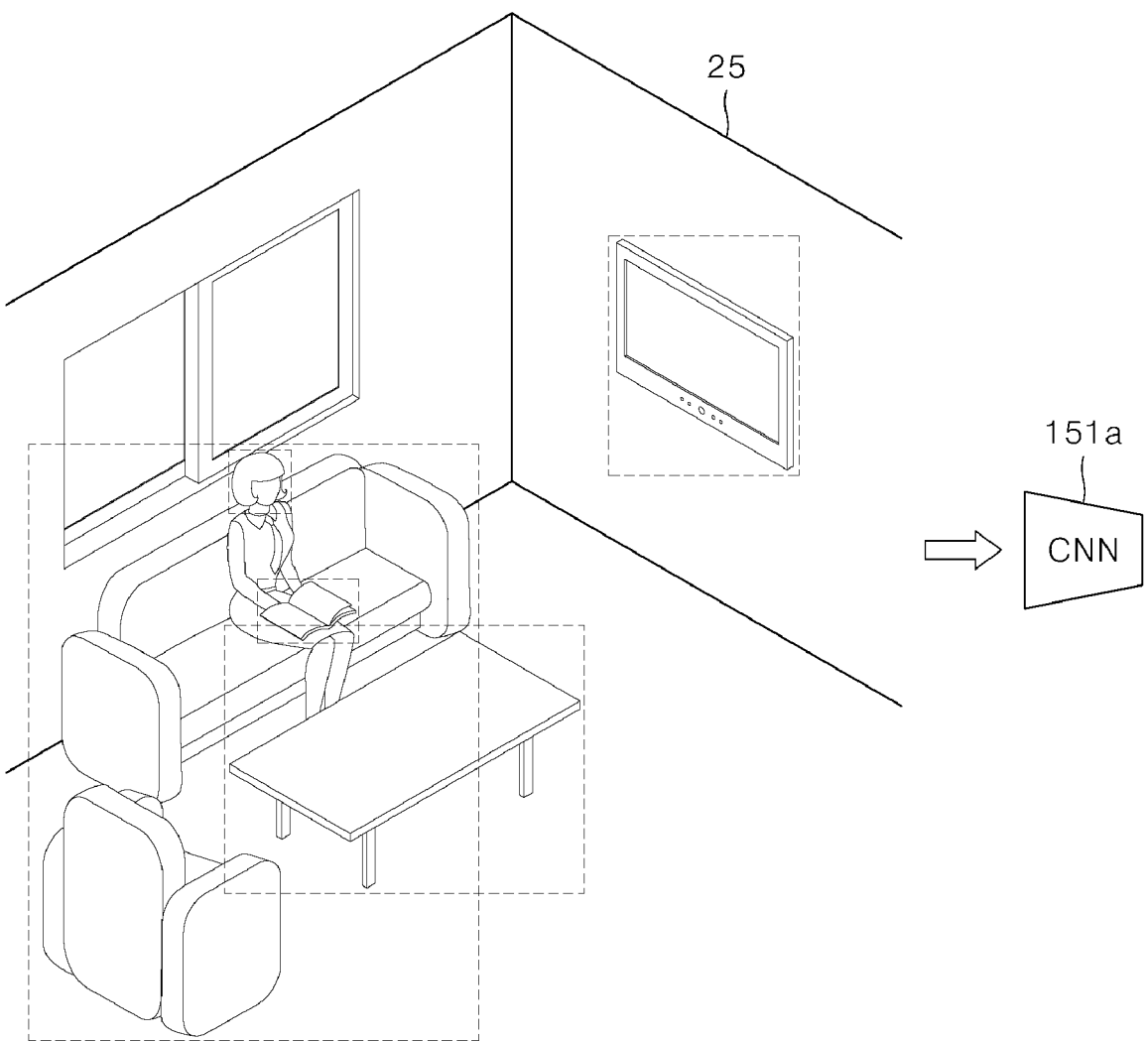
FIG. 4 shows a process in which descriptions are generated by extracting features from an image according to an embodiment.

FIG. 4 shows a process in which descriptions are generated by extracting features from an image according to an embodiment. Reference numeral 25 in FIG. 4 shows a space in which an air conditioner is installed. Reference numeral 25 indicates an image in which a woman is sitting on the sofa reading a book.

The image 25 is input to an encoder 151 of a control unit. Additionally, the encoder 151, e.g., a neural network 151a such as the CNN, extracts features from the input image. In the image 25, rectangles marking around the TV set, the table, the face of the woman, the sofa and the portion of reading book display features extracted by the CNN network visually.

Figure 5:
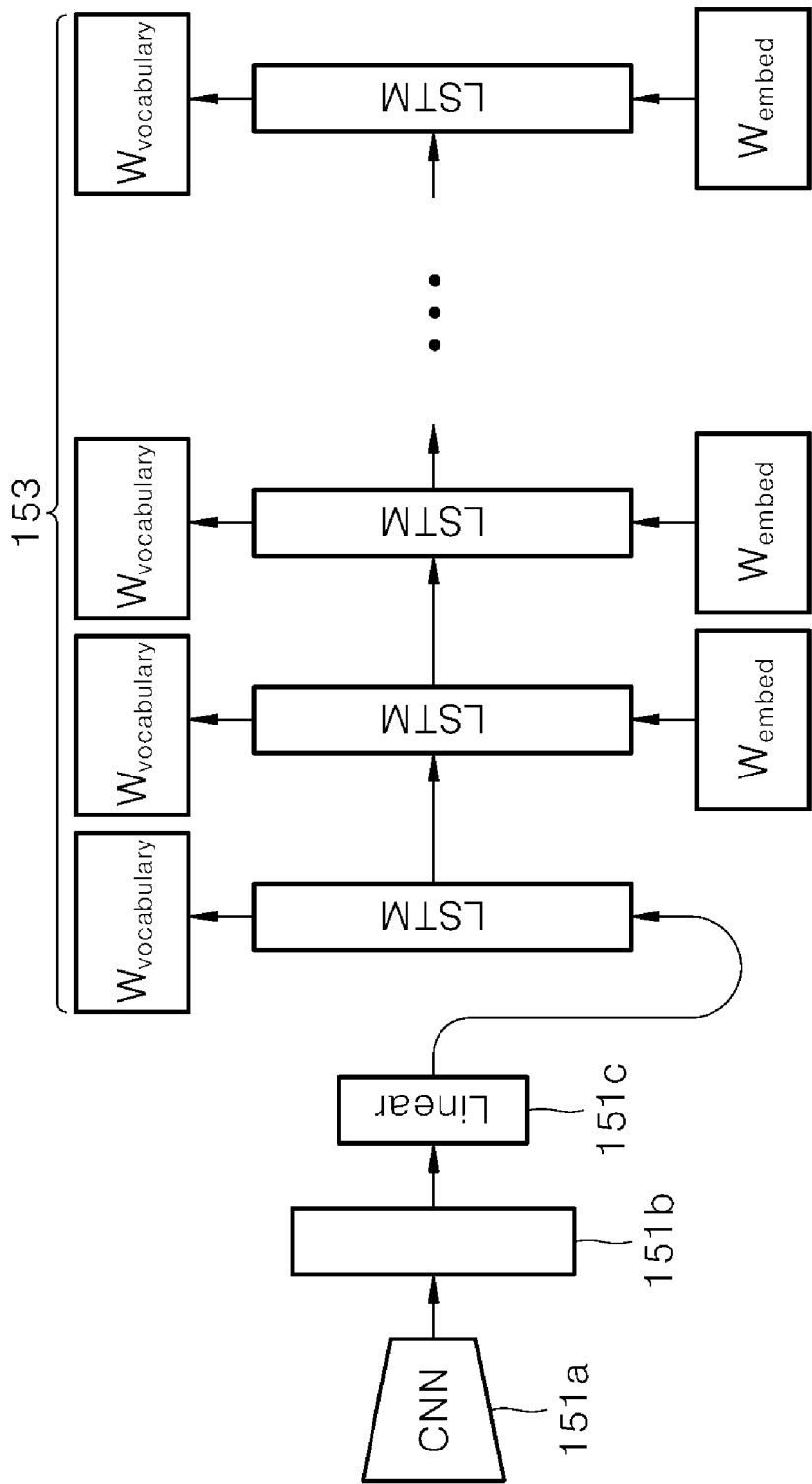
FIG. 5 shows a process in which an image description is generated from extracted features according to an embodiment.

FIG. 5 shows a process in which an image description is generated from extracted features according to an embodiment. Features extracted from an image by a neural network such as the CNN are generated as feature vectors by passing through a pre-processing unit 151b and a linear 151c. A decoder 153 receives the generated feature vectors and outputs predetermined words.

As an exemplary embodiment, long short-term memory (LSTM) that is an exemplary embodiment of the RNN may be used as a component of the decoder 153. The RNN is appropriate for recursive data processing, and the LSTM is applied to outputting words ($W_{vocabulary}$) from input feature vectors, and applied to recursively receiving the words in order to output new words ($W_{embed}$).

The control unit 150 may increase and decrease stored duration of information in each cell of the LSTM. For example, the control unit 150 decreases stored duration of information in each cell when a user moves a lot. Accordingly, the control unit 150 may control the air conditioner at short intervals in response to new information.

Conversely, the control unit 150 increases stored duration of information in each cell when a user moves less. Accordingly, the control unit 150 may control the air conditioner by reflecting long-term movements in a space in response to accumulated information.

The control unit 150 may output the following sentence on the basis of the information generated by the decoder 153 in FIG. 5 in response to the image of FIG. 4.

"On the center-left of the picture, a woman is reading a book in the living room with a TV, table, chair."

The control unit 150 determines a direction and an amount of wind of the air conditioner on the basis of the information of "middle left", "woman", "reading a book", "chair" and the like in the sentence.

Figure 6:
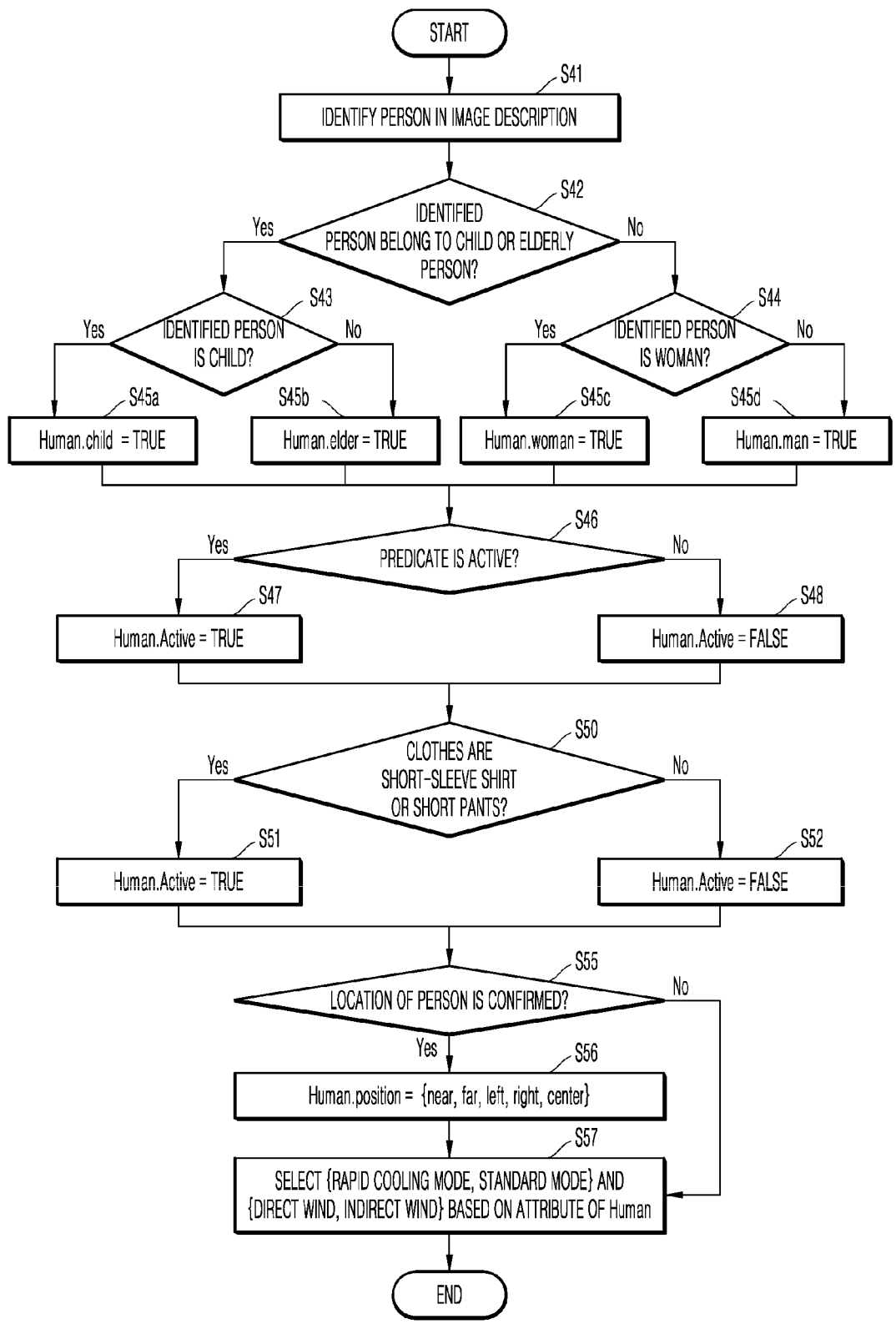
FIG. 6 shows a method of controlling an air conditioner when a person in an image is identified according to an embodiment.

FIG. 6 shows a method of controlling an air conditioner when a person in an image is identified according to an embodiment.

The control unit 150 controls air currents and temperatures of the air conditioner on the basis of classification of a subject and a predicate or classifies information such as an object in addition to a subject and a predicate, features of the clothes worn by a user (e.g., short-sleeve shirts, short pants and the like), the position of a user though prepositional phrases, and the like. Additionally, the control unit 150 controls directions, speeds, amounts, and temperatures of air currents of the air conditioner using the acquired information such that the air currents fit for a user.

The control unit 150 identifies a person in an image description (S41). The control unit 150 confirms whether the identified person is a child/an elderly person (S42). The control unit 150 sets attribute information on the person (S45a. S45b) on the basis of whether the person is a child or an elderly person (S43).

As an exemplary embodiment, the control unit 150 sets attribute information as Human.child=TRUE when the identified person is a child (S45a). As an exemplary embodiment, the control unit 150 sets attribute information as Human.elder=TRUE when the identified person is an elderly person (S45b).

When the control unit 150 does not identify a person as a child/an elderly person through an image in step 42, the control unit 150 sets attribute information on the person (S45c, S45d) on the basis of whether the person is a man or a woman (S44) in the following step.

As an exemplary embodiment, the control unit 150 sets attribute information as Human.woman=TRUE when the identified person is a woman (S45c). As an exemplary embodiment, the control unit 150 sets attribute information as Human.man=TRUE when the identified person is a man (S45d).

Additionally, the control unit 150 determines whether a predicate concerning the person identified in the image description is active or static (S46). As an exemplary embodiment, the control unit 150 sets Human.Active=TRUE when the identified predicate is an active one (play games, run, move, clean and the like) (S47). As an exemplary embodiment, the control unit 150 sets Human.Active=FALSE when the identified predicate is a static one (sit, sleep, lie, read a book, be on the phone and the like) (S48).

Next, the control unit 150 identifies clothes of the person identified in the image description (S50). As an exemplary embodiment, when the identified person is wearing summer clothes such as short-sleeve shirts and short pants, the control unit 150 sets Human.shortcloth=TRUE (S51). When the identified person is wearing a long-sleeve shirt in step 50, the control unit 150 sets Human.shortcloth=FALSE (S52).

Further, the control unit 150 confirms a location of the person identified in the image description using a prepositional phrase and the like in the image description (S55). When the location is confirmed, the control unit 150 sets location information of the identified human. For example, the control unit 150 sets any one or two or more of {near, far, left, right, center} for Human.position (S56).

Next, the control unit 150 generates parameters controlling the air conditioner on the basis of attribute information of the human, which is set in steps S45a to S56, and controls operations of the air conditioner on the basis of the parameters (S57). As an exemplary embodiment, the control unit 150 may select any one of a rapid cooling mode/standard mode as a temperature.

Additionally, the control unit 150 may select any one of a direct wind/an indirect wind as air currents. Certainly, the control unit 150 may select any one of a high speed/middle speed/low speed of wind as intensity of wind in step 57.

The control unit 150 may control the air conditioner on the basis of personal features, features of movements, features of clothes of the identified user according to the process in FIG. 6.

The control over the air conditioner by the control unit 150, in combination of personal features and features of movements, may be described as follows.

In the exemplary embodiment of {"Human.child=TRUE" & "Human.Active=TRUE"}, the control unit 150 may control the air conditioner such that the air conditioner blows wind indirectly in a rapid cooling mode. In the exemplary embodiment of {"Human.child=TRUE" & "Human.Active=FALSE"}, the control unit 150 may control the air conditioner such that the air conditioner blows wind indirectly in a standard mode.

In the exemplary embodiment of {"Human.elder=TRUE" & "Human.Active=TRUE"}, the control unit 150 may control the air conditioner such that the air conditioner blows wind directly in a standard mode. In the exemplary embodiment of {"Human.elder=TRUE" & "Human.Active=FALSE"}, the control unit 150 may control the air conditioner such that the air conditioner blows wind indirectly in a standard mode.

In the exemplary embodiment of {"Human.woman=TRUE" & "Human.Active=TRUE"}, the control unit 150 may control the air conditioner such that the air conditioner blows wind indirectly in a rapid cooling mode. In the exemplary embodiment of {"Human.woman=TRUE" & "Human.Active=FALSE"}, the control unit 150 may control the air conditioner such that the air conditioner blows wind indirectly in a standard mode.

In the exemplary embodiment of {"Human.man=TRUE" & "Human.Active=TRUE"}, the control unit 150 may control the air conditioner such that the air conditioner blows wind directly in a rapid cooling mode. In the exemplary embodiment of {"Human.man=TRUE" & "Human.Active=FALSE"}, the control unit 150 may control the air conditioner such that the air conditioner blows wind directly in a standard mode.

The control over the air conditioner by the control unit 150, in combination of personal features, features of movements, and features of clothes, may be described as follows.

In the exemplary embodiment of {"Human.child=TRUE" & "Human.Active=TRUE" & "Human.shortcloth=TRUE"}, the control unit 150 may control the air conditioner such that the air conditioner blows wind indirectly in a rapid cooling mode. In the exemplary embodiment of {"Human.child=TRUE" & "Human.Active=FALSE" & "Human.shortcloth=FALSE"}, the control unit 150 may control the air conditioner such that the air conditioner blows wind indirectly in a standard mode.

In the exemplary embodiment of {"Human.elder=TRUE" & "Human.Active=TRUE" & "Human.shortcloth=TRUE"}, the control unit 150 may control the air conditioner such that the air conditioner blows wind directly in a standard mode. In the exemplary embodiment of {"Human.elder=TRUE" & "Human.Active=FALSE" & "Human.shortcloth=FALSE"}, the control unit 150 may control the air conditioner such that the air conditioner blows wind indirectly in a standard mode.

In the exemplary embodiment of {"Human.woman=TRUE" & "Human.Active=TRUE" & "Human.shortcloth=TRUE"}, the control unit 150 may control the air conditioner such that the air conditioner blows wind indirectly in a rapid cooling mode. In the exemplary embodiment of {"Human.woman=TRUE" & "Human.Active=FALSE" & "Human.shortcloth=FALSE"}, the control unit 150 may control the air conditioner such that the air conditioner blows wind indirectly in a standard mode.

In the exemplary embodiment of {"Human.man=TRUE" & "Human.Active=TRUE" & "Human.shortcloth=TRUE"}, the control unit 150 may control the air conditioner such that the air conditioner blows wind directly in a rapid cooling mode. In the exemplary embodiment of {"Human.man=TRUE" & "Human.Active=FALSE" & "Human.shortcloth=FALSE"}, the control unit 150 may control the air conditioner such that the air conditioner blows wind directly in a standard mode.

In addition to the above-described examples, when the location of a user is confirmed on the basis of prepositional phrases and the like, the control unit 150 may control the air conditioner such that the air conditioner operates in a rapid cooling mode when the user is far from the air conditioner, and may control the air conditioner such that the air conditioner operates in a standard mode when the user is near the air conditioner. Vice versa. For example, in order to save energy, the control unit 150 may control the air conditioner such that the air conditioner operates in a standard mode when the user is far away from the air conditioner, and may control the air conditioner such that the air conditioner operates in a rapid cooling mode when the user is near the air conditioner.

Additionally, the control unit 150 may control the air conditioner such that the air conditioner blows air directly when the user is far from the air conditioner, and may control the air conditioner such that the air conditioner blows air indirectly when the user is near the air conditioner. Vice versa. For example, in order to save energy, the control unit 150 may control the air conditioner such that the air conditioner blows air indirectly when the user is far from the air conditioner, and may control the air conditioner such that the air conditioner blows air directly when the user is near the air conditioner.

Further, the control unit 150 may increase speeds of wind or may decrease temperatures of wind, which are set for the air conditioner, when the user is far from the air conditioner. Certainly, the control unit 150 may decrease speeds of wind or may increase temperatures of wind, which are set for the air conditioner, when the user is near the air conditioner.

Furthermore, when two or more users are identified, the control unit 150 extracts features of each user. When the extracted features of each user are identical, the control unit uses the features, and when the extracted features of each user are not identical, the control unit adjusts conditions of the air conditioner.

For example, as a result of identifying features of a first user and a second user, the control unit 150 generated parameters controlling the air conditioner "in a rapid cooling mode/direct wind mode" for the first user, and generated parameters controlling the air conditioner in a standard mode/an indirect wind mode" for the second user.

In this case, the control unit 150 controls left and right sides 11, 12 of the air blower 15 respectively when the first user is on the left side of the air conditioner and the second user is on the right side of the air conditioner. As a result, the left side of the air conditioner 1 operates in a rapid cooling mode and in a direct wind mode, and the right side of the air conditioner 1 operates in a standard mode and in an indirect wind mode.

Additionally, the control unit 150 selects parameters respectively when two users are close to each other or when it is difficult to respectively control wind that is blown in both directions. For example, the control unit 150 may select a "rapid cooling mode" as a mode, and may select "indirect wind" as wind. That is, the control unit 150 may select any one of the parameters (rapid cooling/standard mode, direct/indirect wind) that are set for each of the two users.

According to the above-described embodiment, the control unit 150 of the air conditioner 1 may analyze behaviors of a user on the basis of image information, and may control amounts of wind, speeds of wind, operation modes, temperatures and the like of the air conditioner 1 on the basis of results of analysis.

As illustrated in FIG. 6, the control unit 150 controls the air conditioner such that the air conditioner may supply a cool wind or a direct wind on the basis of personal features of an identified user in the order of a man>a woman, a child>an elderly person. Certainly, the order may be changed.

For example, when interrupt input (manual control) such as a decrease in temperatures of the air conditioner, an increase in the speeds of wind, and a selection of a rapid cooling mode occurs despite control by the control unit 150 to allow the air conditioner to supply weak wind in the case in which an elderly person is identified, the control unit 150 may change set values for an elderly person into set values for a child or a woman or a man.

Additionally, the control unit 150 separately stores information (images) of an identified elderly person in the image. Later, the control unit 150 determines the identifier person belongs to another category (e.g., "child" or "woman" or "man") and controls the air conditioner on the basis of determination when the person identified as an "elderly person" is the same as an elderly person in the stored image.

On the contrary, when the person identified later as an "elderly person" by the control unit 150 is different from the elderly person in the stored image, the control unit 150 controls the air conditioner according to the process in FIG. 6.

FIG. 6 shows the embodiment in which the control unit controls the air conditioner in response to attribute information and words when an image description includes attribute information on an identified person in the image or words concerning actions of the identified person in the image or words describing the human. A process of analyzing active/static features of actions of the person is specifically described.

Figure 7:
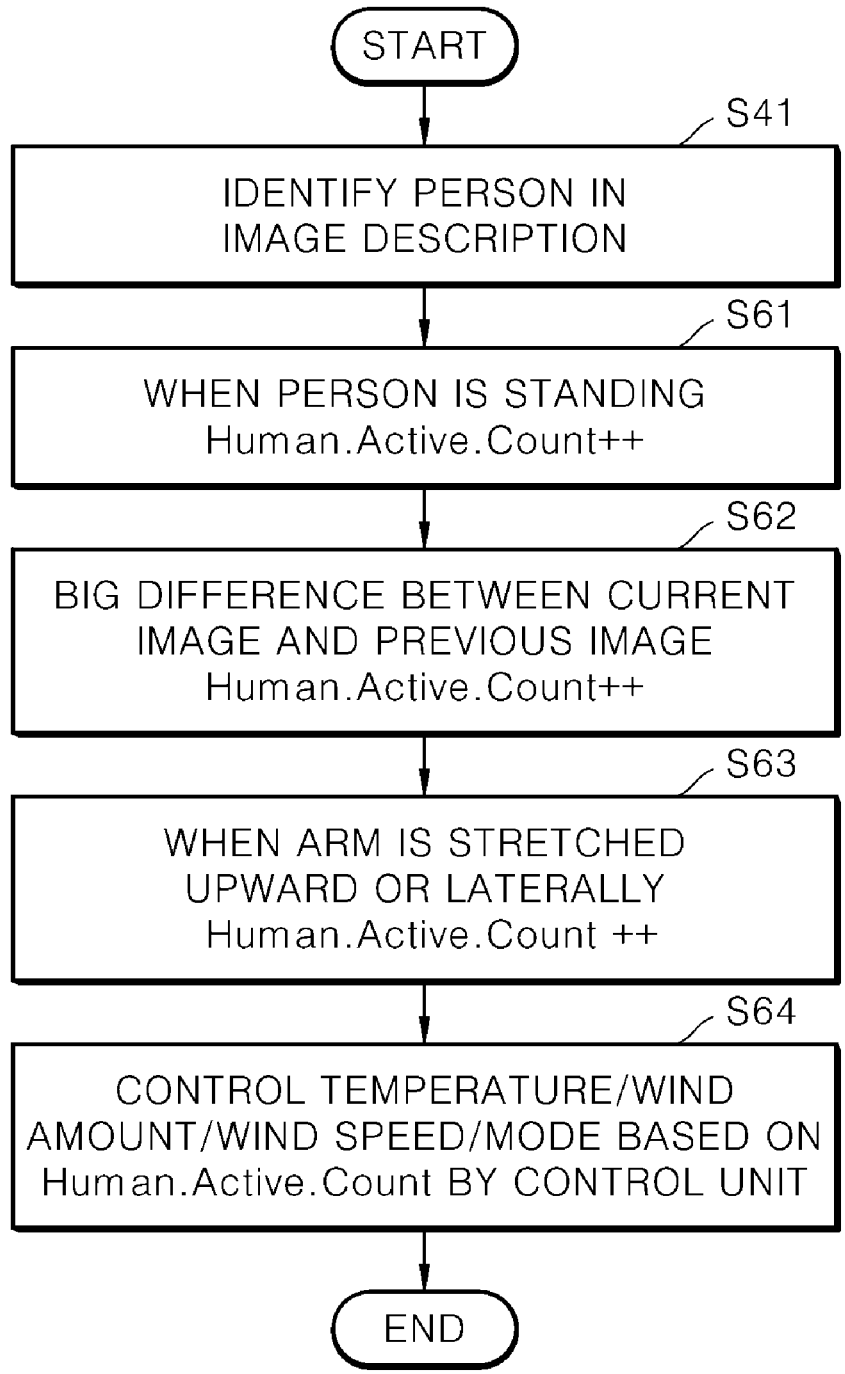
FIG. 7 shows a process in which actions of an identified person in an image description are analyzed according to an embodiment.

FIG. 7 shows a process in which actions of an identified person in an image description are analyzed according to an embodiment.

The control unit 150 identifies a person in an image description (S41). Additionally, the control unit 150 increases a value indicating active features (Human.Active.Count) when the identified person is standing (S61). Likewise, the control unit 150 increases a value indicating active features (Human.Active.Count) when there is a big difference between a current image and a previous image (S62).

Further, the control unit 150 increases a value indicating active features (Human.Active.Count) when the arm of the identified person is stretched upward or laterally (S63).

In addition, the control unit 150 increases a value indicating active features (Human.Active.Count) by collecting various pieces of information used to infer active movements of a human, and then controls temperatures, amounts, speeds of winds blown by the air conditioner or modes of the air conditioner on the basis of the increased values (S64).

Figure 8:
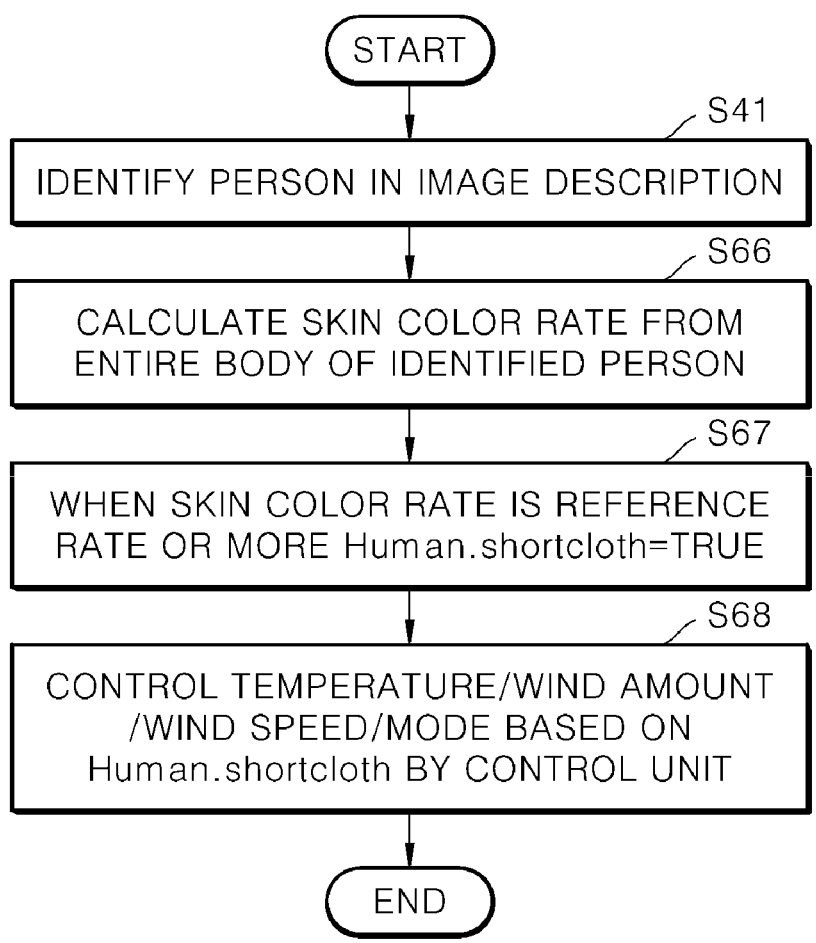
FIG. 8 shows a process in which an air conditioner operates on the basis of clothes worn by an identified person in an image description according to an embodiment.

FIG. 8 shows a process in which an air conditioner operates on the basis of clothes worn by an identified person in an image description according to an embodiment.

The control unit 150 identifies a person in an image description (S41). The control unit 150 calculates a skin color rate from the body of the identified person (S66). When the skin color rate is a reference rate or more (e.g., 30% or more), the control unit determines the identified person is wearing summer clothes. The control unit 150 sets a value of Human.shortcloth as "TRUE" (S67).

When a plurality of people are identified in the image, the control unit 150 calculates values of Human.shortcloth for each of the plurality of humans. Additionally, the control unit 150 controls temperatures, amounts, speeds of winds blown by the air conditioner, modes of the air conditioner and the like on the basis of the calculated values (S67).

In the flow chart of FIG. 8, the image description may include words describing clothes worn by the identified user in the image. When additional description of clothes is not included in the image description, the control unit 150 confirms the exposure of skin color of each human. Next, the control unit 150 confirms whether people in a space are wearing a short-sleeve shirt or short pants, or a long-sleeve shirt/long pants on the basis of results of confirmation.

Figure 9:
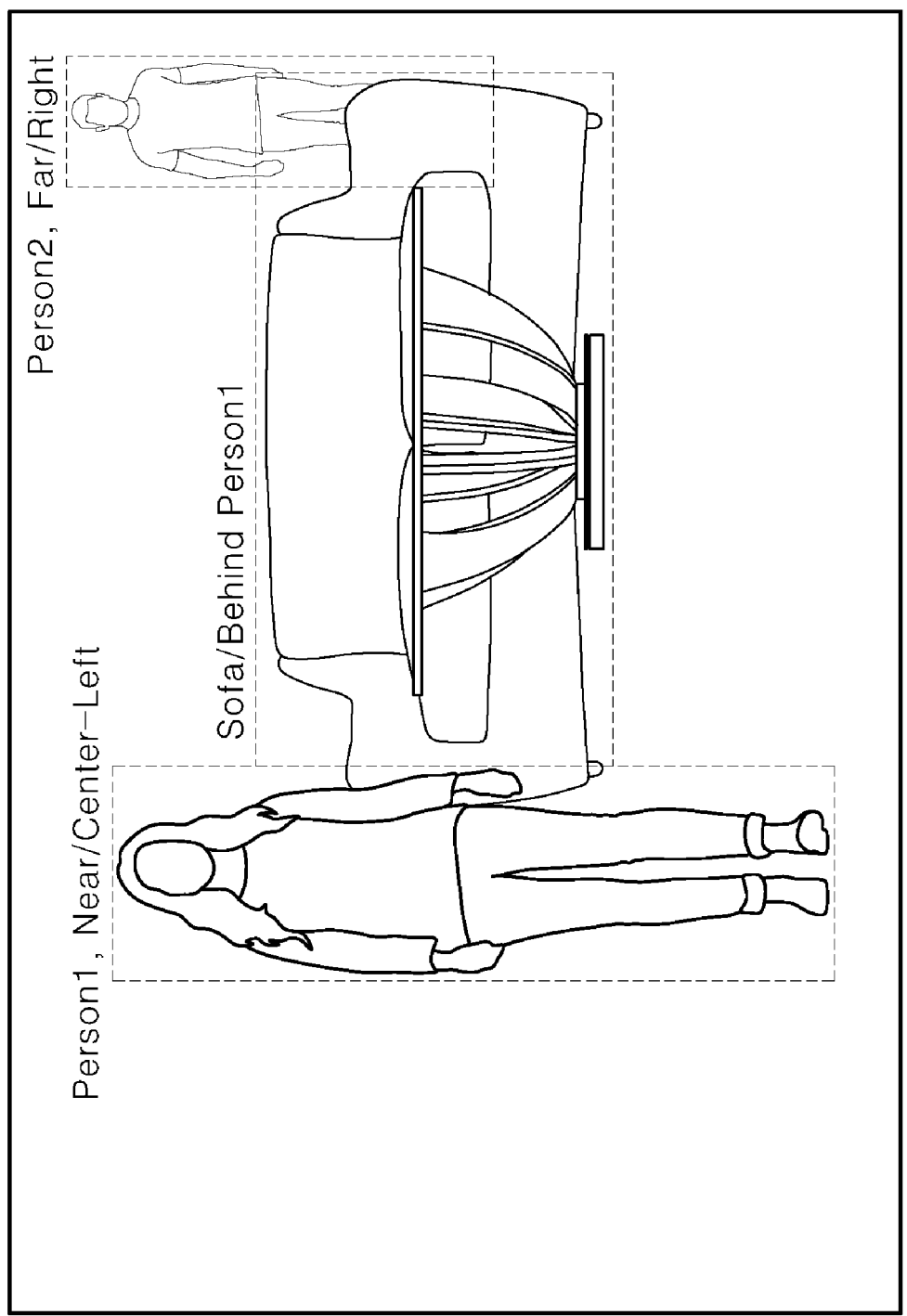
FIG. 9 shows a process of an image description according to an embodiment.

FIG. 9 shows a process of an image description according to an embodiment. The control unit 150 identifies Person1 is near and in the center left (Person1. Near/Center-Left) in the image of FIG. 9. Additionally, the control unit 150 identifies the sofa behind "Person1" (Sofa, Behind of Person1). The control unit 150 identifies Person2 behind the sofa is far and on the right (Person2, Far/Right).

Accordingly, the control unit 150 places increased priority on an image description concerning a person like Person1 at the center of an image or near the air conditioner in the image. For example, the control unit 150 may output the sentence that Person1 is a woman and wearing a long dresses ("Woman wears jacket"). And, the control unit 150 may output the sentence that Person2 is a man and wearing a short-sleeve shirt ("Man wears short sleeves shirt") as a result of the image description.

In this case, the control unit 150 places higher priority on an image description of Person1 near or at the center of the image than an image description of Person 2. As a result, the control unit 150 may control the air conditioner on the basis of the image description of Person1.

An image description includes words corresponding to the location of an identified person in an image. The control unit 150 generates image descriptions that say Person1 is positioned before Person2, Person1 is positioned before a sofa, and the sofa is placed before Person2.

The control unit 150 may control operations of the air conditioner on the basis of the locations of the people. For example, the control unit 150 may blow wind toward Person1 in the front middle left of the air conditioner.

FIG. 10 shows a process of an image description with a focus on a changed image according to an embodiment. Compared with Person1 in FIG. 9, Person1 in FIG. 10 has moved to the left.

The control unit 150 generates an image description of a difference between a first image (image in FIG. 9) acquired at a first point in time and a second image (image in FIG. 10) acquired at a second point in time after the first point in time, by comparing the first image and the second image. That is, there is no change in the sofa and Person2, so the image description concerning the sofa or Person2 is not generated, and the image description about Person 1 which has been changed is generated ("Woman wears jacket, Woman moves left.").

Additionally, the control unit 150 controls the air conditioner with a focus on the difference. For example, the control unit 150 may blow wind toward Person 1 who has moved in the front left direction.

To this end, the control unit 150 may store images during a certain period. When a camera 110 captures images at 10-second intervals during a one-minute period or a five-minute period, the control unit 150 accumulates and stores the images. Additionally, the control unit 150 stores an image description generated for each of the accumulated images.

When a similar image is acquired later, the control unit 150 may apply the previously generated image descriptions to an image description of a currently acquired image.

In a space in which an air conditioner is installed, frequent changes occur on human, and the sofa, the window, the TV set and the like, do not change. Accordingly, the control unit 150 may store image descriptions of objects that make no movement or make almost no movement after repeatedly confirming the image descriptions.

For example, information on objects extracted from repeated image descriptions, which is stored by the control unit 150, is described as follows.

TABLE 1

| Name | Position | Description |
| --- | --- | --- |
| Sofa | Near, Left | Sofa is located on the left. |
| TV | Far, Center | TV is located on the wall. |

When confirming the locations of people later, the control unit 150 may reflect the locations of the sofa and TV set.

Although in embodiments, all the elements that constitute the embodiments of the present disclosure are described as being coupled to one or as being coupled to one so as to operate, the disclosure is not limited to the embodiments. One or more of all the elements may be optionally coupled to operate within the scope of the present disclosure. Additionally, each of the elements may be implemented as single independent hardware, or some or all of the elements may be optionally combined and implemented as a computer program that includes a program module for performing some or all of the combined functions in single hardware or a plurality of hardware. Codes or segments that constitute the computer program may be readily inferred by one having ordinary skill in the art. The computer program is recorded on computer-readable media and read and executed by a computer to implement the embodiments. Storage media that store computer programs includes storage media magnetic recording media, optical recording media, and semiconductor recording devices. Additionally, the computer program that embodies the embodiments includes a program module that is transmitted in real time through an external device.

The embodiments of the present disclosure have been described. However, the embodiments may be changed and modified in different forms by one having ordinary skill in the art. Thus, it should be understood that the changes and modifications are also included within the scope of the present disclosure.

The invention claimed is:

1. An air conditioner, which analyzes a user's behavior patterns and controls operations, comprising:
   an air blower configured to discharge air; and
   a camera configured to acquire images of a space in which an indoor unit of the air conditioner is disposed,
   wherein the air conditioner extracts features from the image acquired by the camera, generates image descriptions, and controls the air conditioner using parameters generated in response to the image descriptions,
   wherein each image description includes a sentence, and the sentence includes a subject, a predicate, an object, and a prepositional phrase for position of a person,
   wherein the image descriptions include information or words concerning actions of the person in the image and active or static features of actions of the person,
   wherein the air conditioner controls air currents and temperatures on the basis of classification of the subject and the predicate, and, if the predicate is active, then the air conditioner increases the air currents or decreases the temperature,
   wherein the air conditioner stores image descriptions and locations of objects that make no movement after repeatedly confirming the image descriptions, and
   wherein the air conditioner confirms a location of the person by reflecting locations of the stored objects.

2. The air conditioner of claim 1, wherein the air conditioner extracts features from the image, generates feature vectors, and generates the image descriptions including words using the feature vectors.

3. The air conditioner of claim 1, wherein the control unit controls any one or more of speeds, amounts, directions, or temperatures of air discharged by the air conditioner, or operation modes of the air conditioner, using the image descriptions.

4. The air conditioner of claim 1, wherein the image description comprises attribute information on an identified person in the image or words concerning actions of the identified person in the image or words describing the human.

5. The air conditioner of claim 1, wherein the image description includes words describing clothes worn by an identified person in the image.

6. The air conditioner of claim 1, wherein the image description includes words corresponding to a location of an identified person in the image.

7. The air conditioner of claim 1, wherein the control unit places higher priority on an image description of a person at the center of the image or a person near the air conditioner in the image.

8. The air conditioner of claim 1, wherein the control unit generates an image description of a difference between a first image acquired at a first point in time and a second image acquired at a second point in time after the first point in time, by comparing the first image and the second image.

9. A method of analyzing a user's behavior patterns and controlling operations of an air conditioner, comprising:
   acquiring images of a space, in which an indoor unit of the air conditioner is disposed, by a camera of the air conditioner;
   extracting features from the images, acquired by the camera, by a control unit of the air conditioner;
   generating image descriptions describing the images on the basis of the extracted features by the control unit; and controlling the air conditioner using parameters generated in response to the image descriptions by the control unit, wherein each image description includes a sentence, and the sentence includes a subject, a predicate, an object, and a prepositional phrase for position of a person, wherein the image descriptions include information or words concerning actions of the person in the image and active or static features of actions of the person, wherein the air conditioner controls air currents and temperatures on the basis of classification of the subject and the predicate, and, if the predicate is active, then the air conditioner increases the air currents or decreases the temperature, wherein the air conditioner stores image descriptions and locations of objects that make no movement after repeatedly confirming the image descriptions, and wherein the air conditioner confirms a location of the person by reflecting locations of the stored objects.

10. The method of claim 9, comprising:

receiving the images, extracting features and generating feature vectors by an encoder of the control unit; and receiving the feature vectors and generating the image descriptions including words by a decoder of the control unit.

11. The method of claim 9, further comprising:

controlling any one or more of speeds, amounts, directions, or temperatures of air discharged by the air conditioner, or operation modes of the air conditioner, using the image descriptions, by the control unit.

12. The method of claim 9, wherein the image description includes words corresponding to a location of an identified person in the image.

13. The method of claim 9, wherein the method further comprises placing higher priority on an image description of a person at the center of the image or a person near the air conditioner in the image by the control unit.

14. The method of claim 9, wherein the method further comprises generating an image description of a difference between a first image acquired at a first point in time and a second image acquired at a second point in time after the first point in time by comparing the first image and the second image by the control unit.

* * * * *